United States Patent [19]

Ko

[11] Patent Number: 5,012,849
[45] Date of Patent: May 7, 1991

[54] INTERNAL TIRE SUPPORT WHEEL

[76] Inventor: Seh D. Ko, 26-203 Ushin villa, San 18, Kung-dong, Kuro-gu, Seoul, Rep. of Korea

[21] Appl. No.: 483,789

[22] Filed: Feb. 23, 1990

[30] Foreign Application Priority Data

Aug. 26, 1988 [KR] Rep. of Korea .......... 13946/1988[U]

[51] Int. Cl.⁵ .................. B60C 17/02; B60C 17/04; B60C 5/00
[52] U.S. Cl. .................... 152/520; 152/158; 301/39 T
[58] Field of Search .............. 152/155, 157, 158, 159, 152/513, 520, 521, 516; 301/39 T

[56] References Cited

U.S. PATENT DOCUMENTS

| 1,300,063 | 4/1919 | Walton | 152/158 |
|---|---|---|---|
| 3,528,472 | 9/1970 | Kubach | 152/517 |
| 4,216,810 | 8/1980 | Osada et al. | 152/520 |
| 4,281,701 | 8/1981 | Ross | 152/520 |
| 4,346,747 | 8/1982 | Osada et al. | 152/520 |
| 4,773,461 | 9/1988 | Landers et al. | 152/520 |

Primary Examiner—Michael W. Ball
Assistant Examiner—Gregory J. Wilber
Attorney, Agent, or Firm—Birch, Stewart, Kolasch & Birch

[57] ABSTRACT

An internal tire support wheel for vehicles which comprises a plurality of tire support plates along both corners of a tire rim wherein the corners are disposed between a drop center and both side flanges of the tire rim, a plurality of legs extending from the support plates, a plurality of foots disposed at ends of the legs, and fastening members for serially connecting the plurality of the plates, whereby upon the deflation of the tire, the internal tire support wheel prevent supports and stabilizes the vehicle, thus preventing the vehicle from tilting.

4 Claims, 3 Drawing Sheets

INTERNAL TIRE SUPPORT WHEEL

BACKGROUND OF THE INVENTION

1. Field of the Invention

The present invention relates to an internal tire support wheel and more particularly, to an improved internal tire support wheel such as an assistant wheel which includes a plurality of arc configured tire support members fixed serially by a fixing member along both side corners disposed between a drop center and both flanges of a rim of a conventional car wheels for preventing from tilting by a flat tire.

2. Description of the Prior Art

Most conventional car wheels include a tire, a rim member for supporting the tire and a disc for inserting the wheel into a hub thereof. The rim member also contains a pair of flange members and a drop center disposed between the pair of flange members. A pair of bead members of the tire is fixed to the inner sides of the flanges so that the air pressure of the tire prevents the tire from separating from the rim.

When the tire is punctured, the tire is separated from the rim occasionally due to the wheel which is structured with a long distance between the flanges and a tire tread of the tire.

SUMMARY OF THE INVENTION

Accordingly, it is an object of the present invention to provide an improved internal tire support for reducing a traffic accident by the flat tire during driving.

Another object of the present invention is to provide an assistant composed of a plurality of arc configured tire support members which is located along side corners disposed between a drop center and both flanges of a rim wheel for shortening the distance between a tire tread and the flanges.

A further object of the present invention is to provide an internal tire support wheel which includes a plurality of tire support members and a fastening members for fixing the tire support members serially along both side corners disposed between a drop center and both flanges of a rim of the wheel. Each tire support member includes an arc plate, front and rear leg members for supporting the arc plate, and a foot member formed, respectively, at the bottom of the leg member for locating on both corners between the drop center and both flanges.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an internal tire support wheel for vehicles which comprises a plurality of tire support plates along both corners of a tire rim wherein the corners are disposed between a drop center portion and both side flanges of the tire rim, a plurality of legs extending from the support plates, a plurality of foots disposed at ends of the legs, and fastening members for serially connecting the plurality of the plates, whereby upon the deflation of the tire, the internal tire support wheel supports and stabilizes the vehicle, thus preventing the vehicle from tilting.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
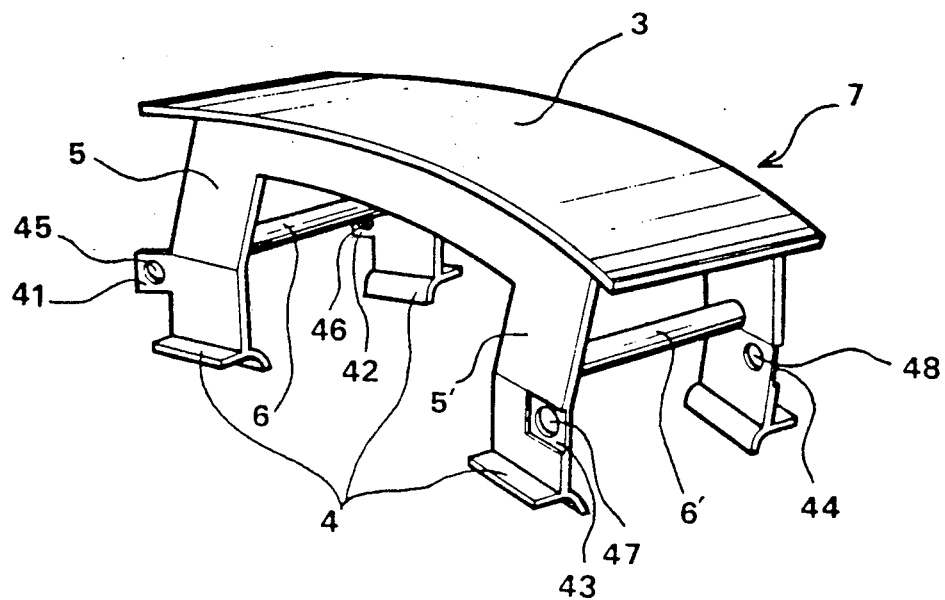
FIG. 1 is a perspective view of an internal tire support member of the internal tire support wheel device according to the present invention.
Figure 2:
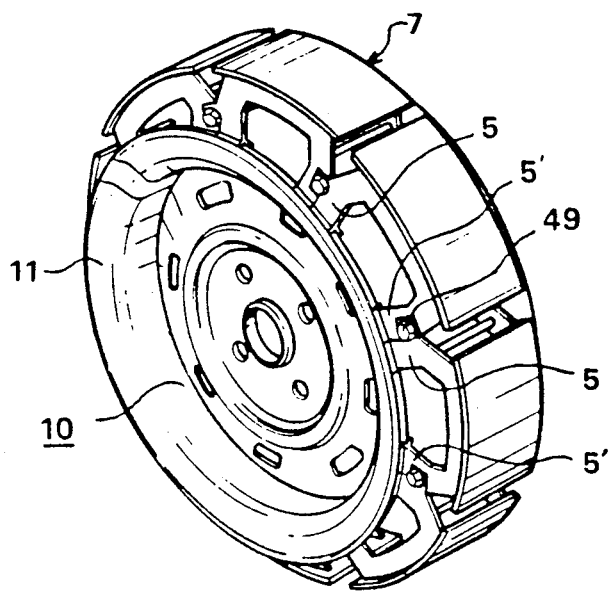
FIG. 2 is a perspective view of the internal tire support wheel fixed on a rim according to the present invention.
Figure 3:
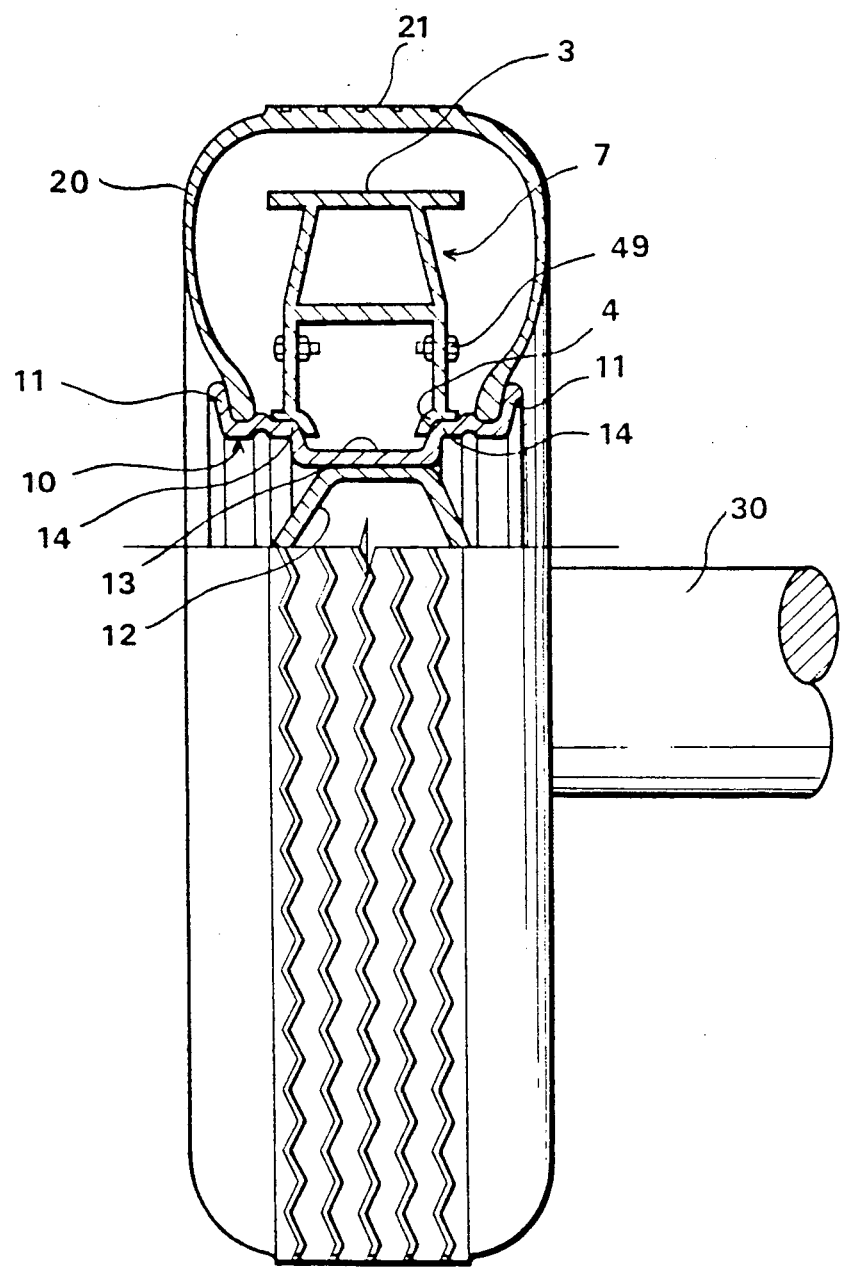
FIG. 3 is a front elevational view of the internal tire support wheel assembled with a conventional car wheel containing cut-away portions in order to illustrate the construction of the internal tire support wheel according to the present invention.

Referring now in detail to the drawings for the purpose of illustrating preferred embodiments of the present invention, the internal tire support wheel 7 as shown in FIGS. 1, 2, and 3, which comprises a plurality of arc configured plates 3, a pair of first legs 5 and a pair of second legs 5' extending from the plate 3, a foot member 4 extending from the leg members 5 and 5' and a fastening members for serially connecting the plurality of plates 3 with one another.

The leg members 5 and 5' support the arc plate 3. The leg members 5 and 5' have a bent portion, respectively. The first and second leg members 5 and 5' are supported by supports 6 and 6', respectively.

At the bottom of the leg members 5 and 5', the foot members 4 are formed, respectively, for preventing the leg members 5 and 5' from separating from a rim 10. The foot members 4 have a slightly C-shape configuration.

As shown in FIG. 3, a wheel includes a disc 12, the rim 10, and a tire 20. The rim 10 has a drop center portion 13, both side flanges 11, and both corners 14 disposed between the drop center portion 13 and both side flanges 11. Therefore, the C-shaped foot members 4 tightly mounting to both corners 14. The tire 20 contains tire beads and a tire tread 21. The disc 12 supports the rim 10 and also, is inserted into a hub 30.

The fastening members include protrusion portions 41 and 42, recessed portions 43 and 44 and fixing apertures 45, 46, 47, and 8. The protrusion portions 41 and 42, are formed at the lower portion of the first leg members 5 extending from one end portion of the arc plate 3, respectively, and the recessed portions 43 and 44 are formed at the lower portion of the second leg members 5' of the another arc plate 3 for fixing to the protrusion portions 41 and 42.

The fixing apertures 45 and 46 are formed at the protrusion portions 41 and 42, respectively, and the fixing apertures 47 and 48 are formed at the recessed portions 43 and 44, respectively.

The fastening means further includes bolt members 49 having nuts.

Flanges 11 are formed both sides of the rim 10, the drop center 13 being formed between the flanges 11 and each corner 14 between the drop center 13 and flanges 11, the tire tread 21 of the tire 20 being contacting with ground during driving or halting, and the tire beads of the tire 20 being fixed at the flanges 11 by the air pressure FIG. 3.

Figure 4:
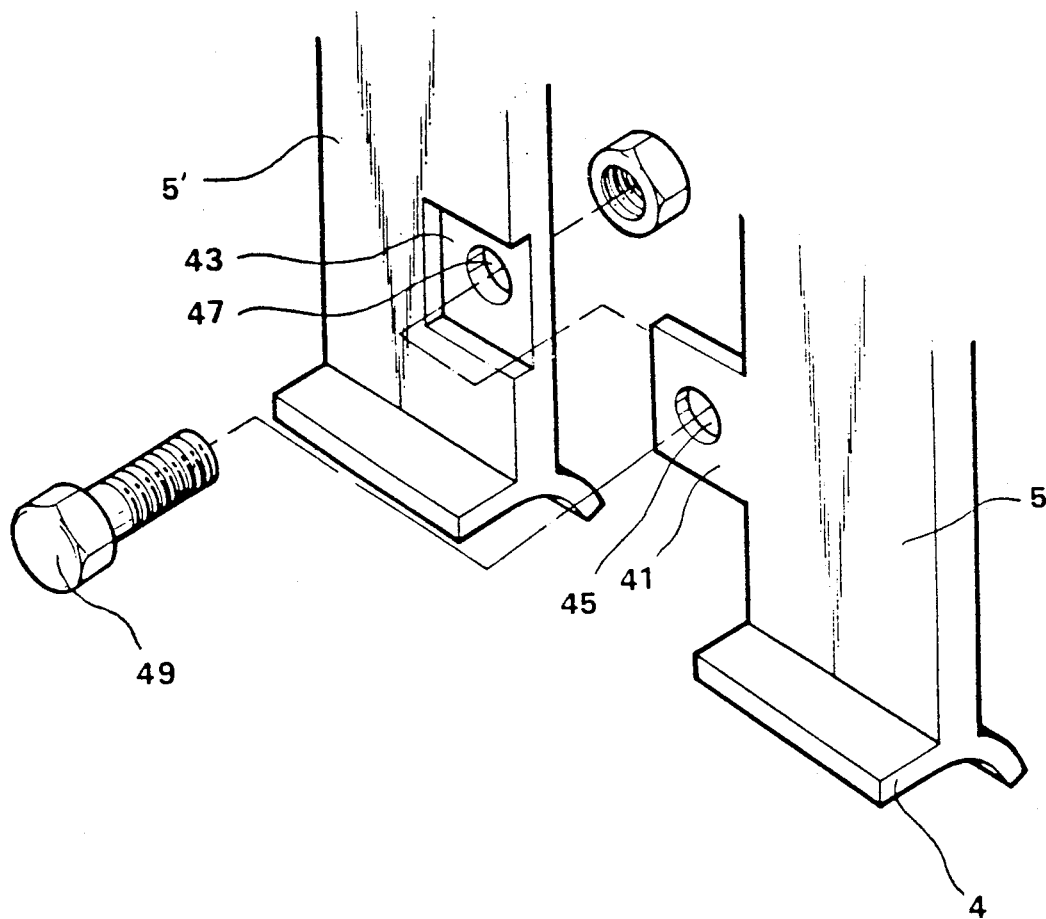
FIG. 4 is an exploded perspective view of the internal tire support members according to the present invention illustrating how to connect the one support member to the other support member.
Figure 5:
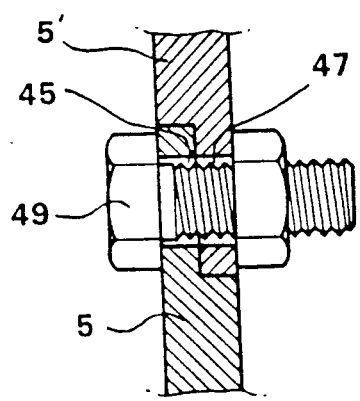
FIG. 5 is a sectional view of FIG. 3, taken along line A—A.

In assembling, the plurality of arc plate 3 are located on the corners 14 by foots 4 thereof. In connecting one arc plate 3 to the other arc plate 3, the pair of protrusion portions 41 and 42 of one plate 3 are inserted into the pair of recessed portions 43 and 44 of the other plate 3, respectively. Thereafter, both plates 3 are connected by inserting the bolt member 49 through the fixing apertures 45, 46, 47, and 48 as shown in FIGS. 4 and 5.

Next, a third plate 3 is also connected to the assembled plates 3. Thus, the plurality of plates 3 repeat to fix to the last plate 3 serially. Accordingly, the diameter of the formed internal tire support wheel 7 is larger than that of the conventional rim 12. Finally, the tire 20 is fixed at the flanges 11.

If the car with the internal tire support wheel 7 is punctured by an accident, the internal support wheel 7 contacts with inner side of the tire tread 21 part on the ground. Therefore, the punctured car is less tilted than the conventional cars. Because the diameter of the internal tire support of the present invention becomes large enough to the distance between flanges 11 and arc plates 3. Accordingly, present invention protects the driver from traffic accident by the flat tire and also makes driving possible to a certain extent regardless of the puncture.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An internal tire support wheel for a vehicle comprising:
    a plurality of tire support members which conform to the configuration of a tire, each of said plurality of tire support members including:
    an arc configured plate,
    a first pair of leg members and a second pair of leg members extending from said arc configured plate at both end positions thereof,
    a foot member extending from each of said leg members for engagement with a tire rim, and
    means for connecting each of said plurality of tire support members to adjacent tire support members, said connecting means including an aperture disposed at a latitudinal extending portion from each of said first leg members, an aperture disposed at a recessed portion in each of said second leg members for tightly receiving said latitudinal extending portion, and a bolt and a nut for securing said extending portion to said recessed portion so as to connect each of the plurality of tire support members to adjacent tire support members, whereby upon the deflation of the tire, the internal tire support wheel supports and stabilizes the vehicle, thus preventing the vehicle from tilting.

2. The internal tire support wheel of claim 1, wherein each of the plurality of leg members has a bent portion in the vicinity of said latitudinal extending portion of the first leg members and said recessed portion of the second leg members, respectively.

3. The internal tire support wheel of claim 1, wherein the foot member has a slightly C-shaped configuration for tightly engaging with a tire rim.

4. The internal tire support wheel of claim 1, wherein each of the leg members is supported by a support rod.